(12) United States Patent
de Graauw et al.

(10) Patent No.: US 9,106,314 B2
(45) Date of Patent: Aug. 11, 2015

(54) CONCURRENT MULTIBAND TRANSCEIVER

(71) Applicant: NXP B.V., Eindhoven (NL)

(72) Inventors: Antonius de Graauw, Haelen (NL); Markus van Schie, Haarlem (NL)

(73) Assignee: NXP B.V., Eindhoven (NL)

(*) Notice: Subject to any disclaimer, the term of this patent is extended or adjusted under 35 U.S.C. 154(b) by 108 days.

(21) Appl. No.: 14/097,097

(22) Filed: Dec. 4, 2013

(65) Prior Publication Data

US 2014/0155001 A1 Jun. 5, 2014

(30) Foreign Application Priority Data

Dec. 5, 2012 (EP) .................................... 12195647

(51) Int. Cl.
| | |
|---|---|
| H04B 1/04 | (2006.01) |
| H04B 1/40 | (2015.01) |
| H04L 27/18 | (2006.01) |
| H04B 1/00 | (2006.01) |
| H04B 1/18 | (2006.01) |

(52) U.S. Cl.
CPC ............... *H04B 1/40* (2013.01); *H04B 1/0053* (2013.01); *H04B 1/0458* (2013.01); *H04B 1/18* (2013.01); *H04L 27/18* (2013.01)

(58) Field of Classification Search
CPC ..... H04B 1/0053; H04B 1/0458; H04L 27/18
See application file for complete search history.

(56) References Cited

U.S. PATENT DOCUMENTS

| | | |
|---|---|---|
| 6,658,265 B1 | 12/2003 | Steel et al. |
| 6,917,815 B2 | 7/2005 | Hajimiri et al. |
| 6,990,357 B2 | 1/2006 | Ella et al. |
| 8,816,794 B2 | 8/2014 | Sako et al. |
| 8,824,975 B2 | 9/2014 | Sato et al. |
| 2007/0142014 A1 | 6/2007 | Wilcox |
| 2007/0155350 A1* | 7/2007 | Razavi et al. ................. 455/147 |
| 2009/0081965 A1 | 3/2009 | Erceg et al. |
| 2011/0279184 A1 | 11/2011 | Chan et al. |

(Continued)

FOREIGN PATENT DOCUMENTS

| | | |
|---|---|---|
| CN | 1868132 A | 11/2006 |
| CN | 101971492 A | 2/2011 |

(Continued)

OTHER PUBLICATIONS

Extended European Search Report for Patent Appln. No. 12195647.8 (Jun. 28, 2013).

(Continued)

*Primary Examiner* — David Bilodeau

(57) ABSTRACT

The invention refers to an RF front-end (100) adapted to perform either in a receiving mode or in a transmitting mode and adapted to receive or transmit signals located in at least two separated frequency bands, respectively comprising an input and an output and further comprising

- an input matching circuit (1) comprising a first input coupled to the input of the RF front-end (100),
- an output matching circuit (2) coupled to the output;
- the input matching circuit (1) being coupled to the output matching circuit (2) via respective first amplifier (3) and second amplifier (4), and
- a phase shifter (5) coupled either to the input of the RF front-end (100) in a receiving mode, or to the output of the RF front-end (100) in a transmitting mode.

14 Claims, 5 Drawing Sheets

(56) References Cited

U.S. PATENT DOCUMENTS

2011/0299431 A1    12/2011  Mikhemar et al.
2014/0159935 A1*    6/2014  de Graauw et al. ............. 342/21

FOREIGN PATENT DOCUMENTS

| CN | 102096079 A | 6/2011 |
| CN | 102414996 A | 4/2012 |
| WO | 2011/026522 A1 | 3/2011 |

OTHER PUBLICATIONS

Ryynanen, J. et al. "Integrated Circuits for Multi-Band Multi-Mode Receivers", IEEE Circuits and System Magazine, 12 pgs (2006).

Fukuda, A. et al. "A High Power and Highly Efficient Multi-band Power Amplifier for Mobile Terminals", IEEE Radio and Wireless Symposium, pp. 45-48 (Jan. 2010).

Wu, Chong-Ru et al. "A 3-5 GHz Frequency-Tunable Receiver Frontend for Multiband Applications", IEEE Microwave and Wireless Components Letters, vol. 18, No. 9, p. 638-640 (Sep. 2008).

Meharry, D. E. et al. "Broad Bandwidth Transformer Coupled Differential Amplifiers for High Dynamic Range", IEEE Journal of Solid-State Circuits, vol. 34, No. 9, p. 1233-1238 (Sep. 1999).

Taghian, F. et al. "Design and Nonlinear Analysis of a Dual-Band Doherty Power Amplifier for ISM and LMDS Applications", IEEE Applied Electromagnetics Conference, 4 pgs.(Dec. 2011).

Extended European Search Report for Patent Appln. No. 12195634.6 (Jun. 6, 2013).

* cited by examiner a) top view
b) common mode
c) differential mode
d) cross section

CONCURRENT MULTIBAND TRANSCEIVER

CROSS-REFERENCE TO RELATED APPLICATIONS

This application claims the priority under 35 U.S.C. §119 of European patent application no. 12195647.8, filed on Dec. 5, 2012, the contents of which are incorporated by reference herein.

FIELD OF THE INVENTION

The invention relates to a concurrent multiband receiver or transmitter adapted to receive or transmit signals in more than one frequency band simultaneously.

BACKGROUND OF THE INVENTION

Modern transmitters and receivers are often required to be able to operate in different frequency bands. This can be done using different solutions.

A first possibility is to use parallel transmitters or receivers where each transmitter/receiver is used for a specific frequency band. This is a costly solution in terms of component count, area and power consumption.

Another possibility is to use tunable elements in the transmitter or receiver, the elements being tuned for specific frequency bands. The tunable elements can use e.g. varactors, such that the transmitter or receiver can be tuned for operation in different frequency bands as it is shown by Chong-Ru Wu et al., "A 3-5 GHz Frequency-Tunable Receiver Frontend for Multiband Applications", in IEEE MICROWAVE AND WIRELESS COMPONENTS LETTERS, VOL. 18, NO. 9, Sep. 2008. This solution requires expensive tunable components and additional digital circuitry for tuning the circuits to the correct frequency.

Yet another alternative, which is often used to support multiband operation is to switch between different frequency bands as it is shown by Atsushi Fukuda et al. "A High Power and Highly Efficient Multi-band Power Amplifier for Mobile Terminals" in 2010 IEEE Radio and Wireless Symposium conference publications pages 45-48. This can be done with capacitor banks and switches, or even by switching between complete matching networks. Using this alternative, additional circuitry is necessary for implementing the multiband operation.

In another alternative, one may use wideband circuits in the transmitter or receiver. However, the maximum bandwidth of practical building blocks is naturally limited. Apart from this, for a wideband receiver there is the disadvantage of being sensitive to unwanted sources that fall within the receiver bandwidth. In a similar way, a wideband transmitter will amplify unwanted input signals that fall within the transmitter bandwidth.

All the previously presented alternative solutions, except the last one, have in common that the transmitter or receiver are capable of transmitting or receiving in only one frequency band at a time, reducing the throughput of the system as it is shown by Jussi Ryynanen et al., "Integrated Circuits for Multi-Band Multi-Mode Receivers" in the Special Issue on Wireless Reconfigurable Terminals—Part II, IEEE Circuits and Systems Magazine, second quarter 2006.

Other alternative solutions are known from e.g. U.S. Pat. No. 6,658,265 and U.S. Pat. No. 6,917,815.

U.S. Pat. No. 6,658,265 discloses a dual mode amplifier capable of operating in a common mode for one frequency band and a differential mode for a second frequency band. In the common mode, the amplifier provides two identical signals to a matching network, and in the differential mode, the amplifier provides two signals that are 180° out of phase from one another to the matching network. The matching network is configured to maintain the same input and output impedance regardless of whether the amplifier is operating in the common mode or differential mode. Since the matching network operates on two signals, either common or differential, a power combining network is typically required to combine the two signals into a single signal for transmission. It is observed that the system does not support concurrent multiband operation.

U.S. Pat. No. 6,917,815 discloses an architecture for a concurrent dual band high-frequency receiver. It combines a concurrent dual-band front-end subsystem having a dual-band antenna, dual band pre-amplifier filter and concurrent dual-band LNA with an image rejection down converter to provide the functions of a typical receiver, including reception, amplification and down conversion of a signal in two discrete desired frequency bands simultaneously. The system disclosed here is a concurrent dual band receiver architecture but it doesn't make use of simultaneous common mode and differential mode operation.

It is therefore a need to obtain a front-end that works concurrently and provides both differential and common mode of operation with the advantage of reducing the costs and the footprint of the circuits.

SUMMARY OF THE INVENTION

Hence, it is a need, to obtain a front-end that works in multiple frequency bands with reduced cost and footprint. It is therefore an object of the invention to provide an RF front-end adapted to perform either in a receiving mode or in transmitting mode and adapted to receive or transmit signals located in at least two separated frequency bands, respectively comprising an input and an output and further comprising an input matching circuit comprising a first input coupled to the input of the RF front-end, an output matching circuit coupled to the output of the RF front-end;

the input matching circuit being coupled to the output matching circuit via respective first amplifier and second amplifier, and a phase shifter coupled either to the input of the RF front-end in a transmitting mode, or to the output of the RF front-end in a receiving mode.

The invention is defined by the independent claim. Dependent claims define advantageous embodiments.

The phase shifter comprises a delay line or a lumped passive or active filter. The choice would be dependent on the frequency range of the input signals. For lower frequencies lumped-element solutions might be more suitable for implementation. For higher frequencies situated in GHz range or millimeter wave range i.e. tenths or hundreds of GHz an implementation using transmission lines might be more suitable.

The phase shifter provides at its respective output an odd multiple of 180° phase shift of a signal situated in a first frequency band applied to its input.

The phase shifter provides at its respective output an even multiple of 180° phase shift of a signal situated in a second frequency band applied to its input.

The input matching circuit may comprise a T filter comprising inductors. The output matching circuit may comprise a T filter comprising inductors. Preferably, both circuits would have the same topology and probably the easiest implementation is achieved using inductors. However, it is not necessary that both circuits are identical. The choice would depend on the application where the circuit is used.

The input matching effectuates impedance-matching between the source impedance and the common-mode input impedance of the combined amplifiers in the first frequency band, and between the source impedance and the differential mode input impedance of the combined amplifiers in the second frequency band.

The output matching circuit provides a similar role for the output side.

The first amplifier and the second amplifier are single-ended or differential amplifiers. The first amplifier and the second amplifier might be transconductance amplifiers. In the very simple form the amplifiers could be a transistor made in any technology as e.g. bipolar, GaAs or, in general, a III-V compound, CMOS etc. However, depending on the application the amplifiers may be transimpedance amplifier and more general any type of controlled sources.

In applications as radar, high frequency communications as car to car communication using IEEE 802.11/p standard or a combination thereof it is preferable to have a transmitter comprising a signal combiner as described above in any of the embodiments, the RF front-end being coupled to a dual mode multiband antenna.

In the above application it is preferable to have a receiver comprising a signal splitter coupled to an RF front-end as described above.

In an embodiment of the invention the communication devices are mounted on a vehicle as a car.

BRIEF DESCRIPTION OF THE DRAWINGS

The above and other advantages will be apparent from the exemplary description of the accompanying drawings in which.

DETAILED DESCRIPTION OF EMBODIMENTS

Figure 1:
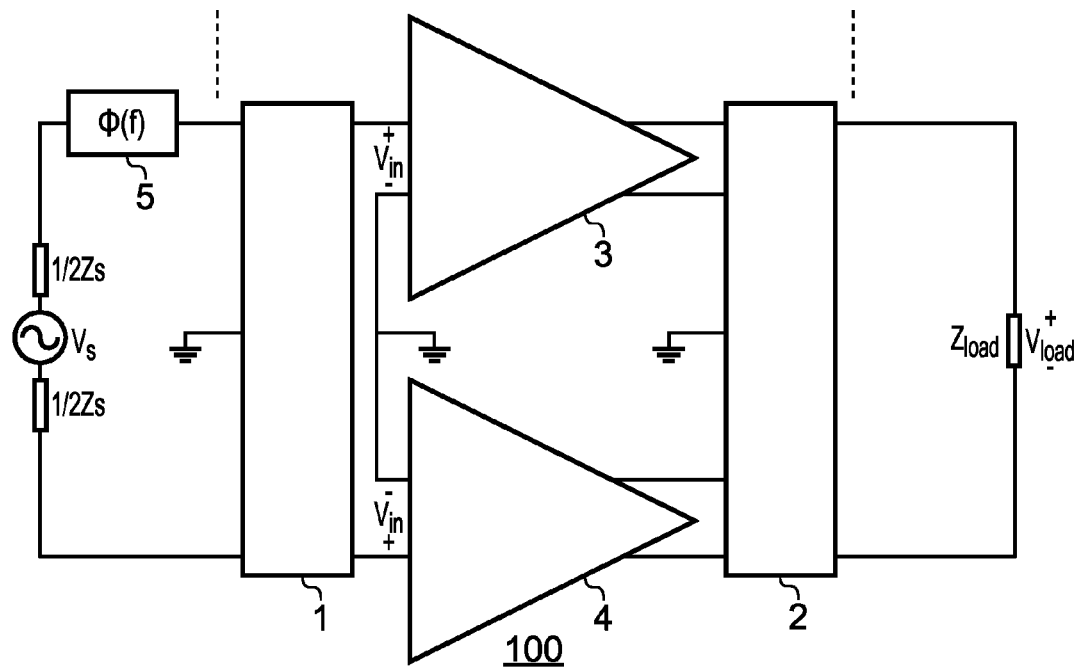
FIG. 1 depicts an RF front-end configured as a transmitter according to the invention.

FIG. 1 depicts an RF front-end according to the invention and used in a transmitter. The RF front-end (100) is adapted to transmit signals located in at least two separated frequency bands comprising an input and an output and further comprising a phase shifter (5) coupled to the input of the RF front-end (100). The RF front-end further comprises an output matching circuit (2). The phase shifter (5) is coupled to the output matching circuit (2) via a first amplifier (3) and second amplifier (4), respectively.

The RF front-end (100) further comprises an input matching circuit (1) comprising a first input coupled to the input of the RF front-end (100) and a second input coupled to the phase shifter (5), the first matching circuit (1) further comprising a first output coupled to an input of the first amplifier circuit (3) and a second output coupled to an input of the second amplifier circuit (4). The RF front-end (100) further comprises an output matching circuit (2) comprising a third input coupled to an output of the first amplifier circuit (3), and a fourth input coupled to an output of the second amplifier circuit (4). Preferably the input matching circuit (1) has the same structure as the output matching circuit (2). That means that the topology of the respective circuits may be identical, but not necessary the values of respective devices used therein.

The current invention is capable of providing amplification of signals in multiple frequency bands, without the need of switches or tunable components. The RF front-end can be designed such that amplification is provided in multiple frequency bands with a high degree of freedom in positioning the different operating frequencies. Also, with the present invention, simultaneous operation in different bands is supported. This, for example, enables the design of a multi-band receiver in which a single low noise amplifier (LNA) is used to simultaneously amplify signals in different telecommunication bands. A second example can be a base station transmitter in which a power amplifier is used to simultaneously amplify two different bands, leading to higher system efficiency and lower hardware costs. Yet another example could be the use in radar systems.

The phase shift of the phase shifter (5) is dependent on frequency. For a frequency $f_{0\_cm}$ the phase shift of the phase shifter (5) is an odd multiple of 180 degrees in a transmitting mode. For this frequency therefore, the amplifier input voltages in both branches at the input reference plane are in-phase, causing the differential amplifier achieved with the first and second amplifiers (3,4) to operate in common mode. For this frequency also the output voltages at the output voltage reference plane are in phase. For a frequency $f_{0\_dm}$, the phase shift of the phase shifter (5) is an even multiple of 180 degrees. For this frequency therefore the input voltages at the input reference plane are 180 degrees out of phase, and the amplifier formed by the first and second amplifier (3,4) operates in differential mode. At this frequency the voltages at the output reference plane also have a 180 degrees phase difference.

It is observed that the RF front-end can operate simultaneously in multiple bands, even if it does not include tunables devices or switches. In a receiving mode, this means that the source signal comprising a common mode component and a differential mode component, is amplified by the amplifiers. The output signals of the amplifiers comprise a common mode component and a differential mode component. The output signal of one of the amplifiers is then phase shifted by the phase shifter (5).

If the phase shifter (5) is implemented such that the insertion phase is an odd multiple of 180 degrees at different frequencies, common-mode operation is possible at the same frequencies, provided that the amplifiers are impedance matched at these frequencies for the common mode. This can be done by designing the input and output matching networks (1, 2) to provide the correct common-mode impedance transformations at these frequencies.

If the phase shifter (5) has an insertion phase being an even multiple of 180 degrees at different frequencies, differential mode operation is possible at these same frequencies, provided that the differential input and output impedances are impedance matched by the matching networks at these frequencies.

Figure 2:
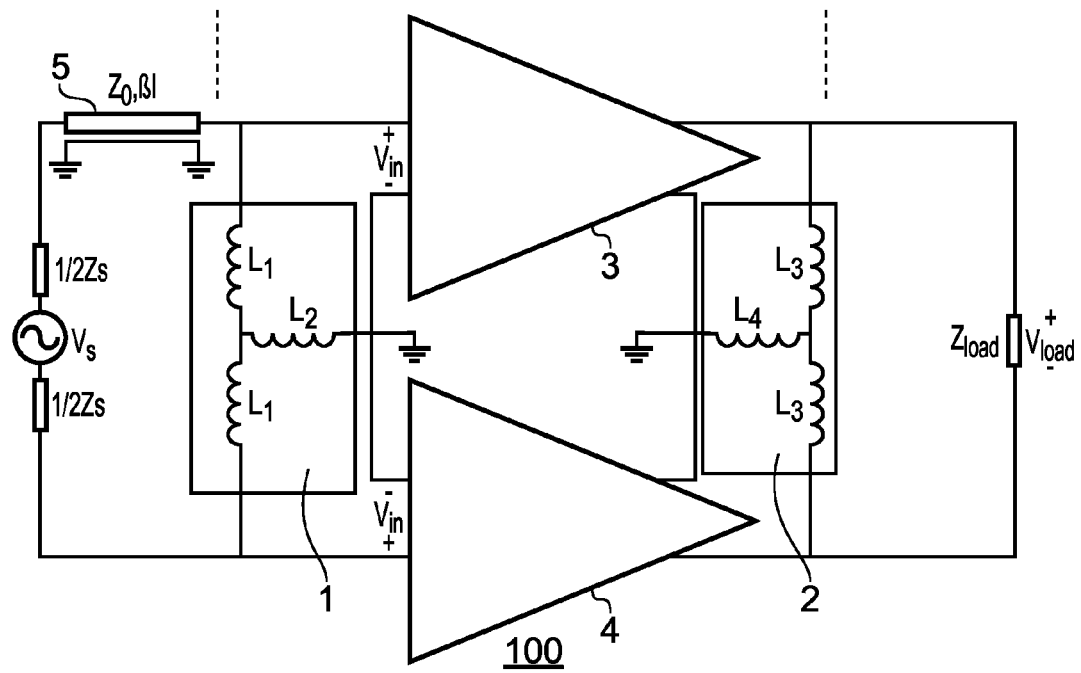
FIG. 2 depicts a more detailed view of an RF front-end configured as a transmitter according to the invention.
Figure 3:
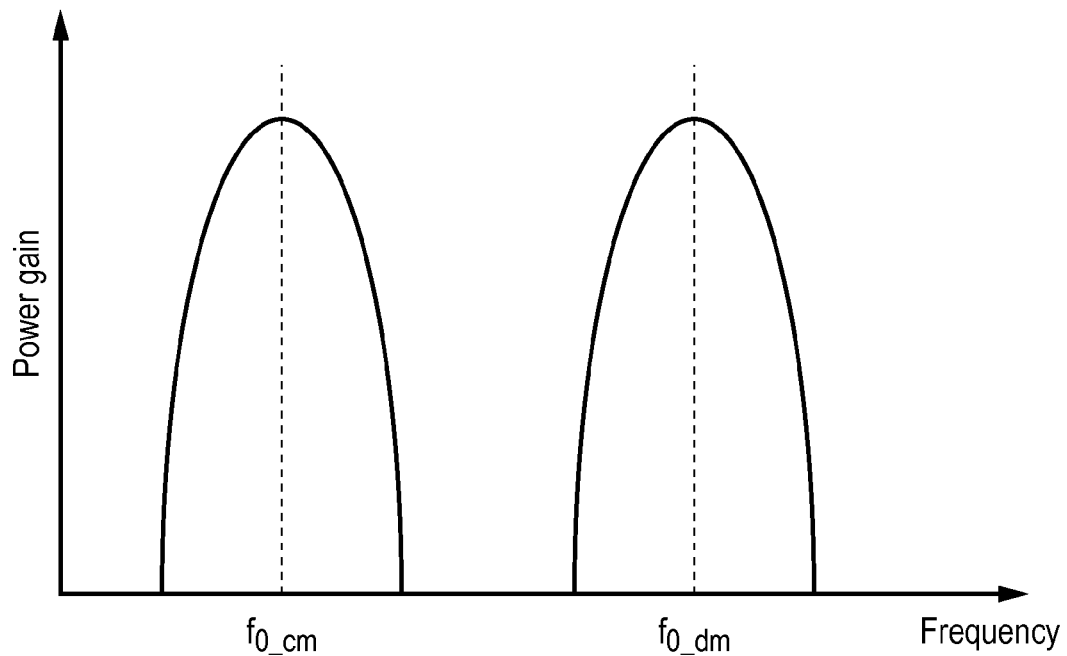
FIG. 3 depicts the power gain of the RF front-end according to the invention.

FIG. 2 shows a more detailed picture of the RF front-end. It consists of two amplifiers (3,4), an input matching network (1) for the common mode input impedance and the differential mode input impedance, an output matching network (2) for the common mode and differential mode output impedance, and a phase shifter (5) implemented as a transmission line. The phase shifter (5) may be implemented in several ways, for example with lumped components, passive all-pass filters, etc. The transmission line (5) has an electrical length β1 equal to 180 degrees at f0_cm, and an electrical length of 360 degrees at f0_dm. If in the differential mode the amplifiers' input and output impedances are matched at f0_dm and the amplifiers common mode input and output impedance is matched at f0_cm, the power gain can be as in is shown in FIG. 3.

It can be shown that two sets of requirements need to be fulfilled in order to have power gain at a frequencies $f_{0\_cm}$ and $f_{0\_dm}$:

1. The phase shift of the phase shifter (5) must be an odd multiple of 180 degrees at frequency $f_{0\_cm}$ and an even multiple of 180 degrees at frequency $f_{0\_dm}$;
2. The common mode input and output impedance must be matched at frequency $f_{0\_cm}$.

The differential mode input and output impedance must be matched at frequency $f_{0\_dm}$.

The first and the second of the above mentioned requirements can even be met at more than two frequencies, leading to a multiband transceiver. In this embodiment the first requirement is naturally fulfilled at multiple frequencies due to the natural phase behavior of the transmission lines as a function of frequency. In this embodiment, the second requirement of having an impedance match for the common and differential mode input and output impedance is fulfilled only at $f_{0\_cm}$ and $f_{0\_dm}$ respectively. This is a consequence of the low complexity of the matching network, which are T's of inductors. The matching network components L1, L2, L3 and L4 in FIG. 2 can be chosen by using the formulas below.

$$f_{0,dm} = \frac{1}{2\pi\sqrt{L_1 C_{in}}}$$

$$f_{0,dm} = \frac{1}{2\pi\sqrt{L_3 C_{out}}}$$

$$f_{0,cm} = \frac{1}{2\pi\sqrt{L_1 C_{in} + 2L_2 C_{in}}}$$

$$f_{0,cm} = \frac{1}{2\pi\sqrt{L_3 C_{out} + 2L_4 C_{out}}}$$

The embodiment presented above is just one of many implementation options. The phase shifter (5) and matching networks (1,2) can be implemented in several alternative ways. For example, the order of complexity of the matching network can be increased to allow for multiband impedance matching. The matching networks (1,2) could also be implemented using distributed elements instead of lumped elements or using a combination thereof. Also the phase shifter (5) may be implemented in different ways. In some situations e.g. at low frequencies the use of phase shifters using lumped components can be beneficial to save area. Active phase shifters can also be used. It is very important that the phase shift is either an even or an odd multiple of 180 degrees and that the impedance matching frequency for the common mode(s) corresponds with the frequency where the phase shift of the phase shifters is an odd multiple of 180 degrees while it is an even multiple of 180 degrees at frequencies where the amplifier is impedance matched for the differential mode.

Figure 4:
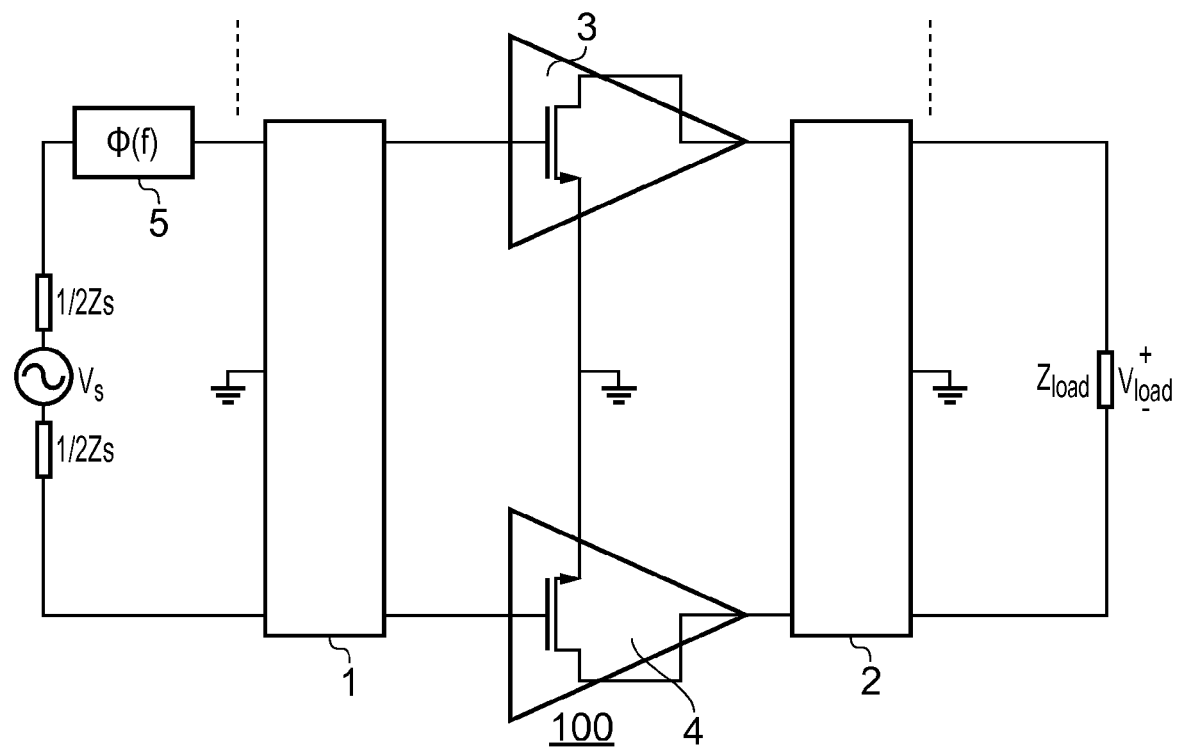
FIG. 4 depicts another embodiment of the RF front-end according to the invention.

FIG. 4 depicts another embodiment of the RF front-end according to the invention. It can be seen that each of the amplifiers 3,4 can be single ended or differential as it was already shown in FIG. 1 or 2. The first amplifier and the second amplifier might be transconductance amplifiers. In the very simple form the amplifiers could be a transistor made in any technology as e.g. bipolar, GaAs or, in general, a III-V compound, CMOS etc. However, depending on the application the amplifiers may be transimpedance amplifiers and more general any type of controlled sources.

Even more, when they may be implemented as single transistor amplifiers they may be connected as common base (gate) or emitter (source) follower, too.

Figure 5:
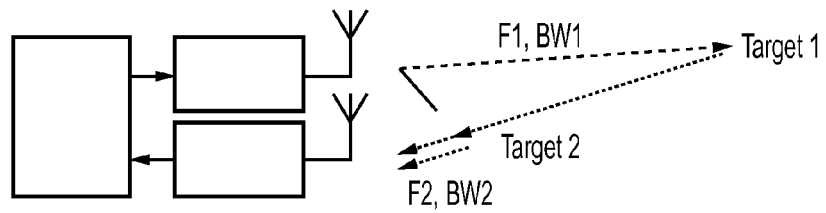
FIG. 5 depicts a radar system using the RF front-end according to the invention.

FIG. 5 depicts a radar system using the RF front-end according to the invention. To be more precise, the embodiment refers to a low cost Multiband Radar Transceiver.

This system consists of a Radar Transmitter plus Receiver that is capable of emitting and receiving a series of continuous wave frequency chirps or pulses in two frequency bands F1 and F2 with frequency bandwidths BW1 and BW2.

The transmitter and receiver blocks are connected to a radar signal controller/processor block. This block generates the radar pulses/chirps and derives the range, velocity and angle of multiple targets from the time of flight and phase relations of the reflected signals.

When the RF front-end according to the invention is used into a Multiband Radar it offers the following advantages compared to a conventional Single band Radar system:

The Frequency and Bandwidth may be optimized as function of the detection requirements i.e.

Long Distance, Moderate Resolution: Low Frequency, Narrow Bandwidth.

Short Distance, High Resolution: High Frequency, Large Bandwidth

Range resolution and Bandwidth are related according to: $\Delta R = c/(2.BW)$, wherein c is the speed of light and BW is the frequency bandwidth. Angular resolution depends upon the size of the antenna aperture in terms of wavelength and improves with the frequency for a given antenna aperture size. The relation between Range and Frequency/Bandwidth is complex; the detection range typically decreases for higher frequency and larger bandwidth.

Concurrent multiband operation enables a smooth frequency transition of detected targets depending upon their distance and required resolution.

Concurrent operation in multiple frequency bands increases the rate at which information from the targets is detected and therefore decreases the response time of the system.

Multiband operation according to this application saves system cost by re-use of the transceiver and antenna hardware.

Figure 6:
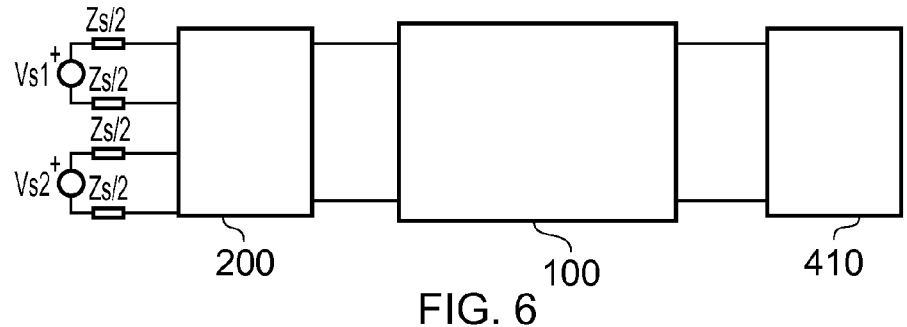
FIG. 6 depicts a radar system with dual mode multiband antenna, according to the invention.

FIG. 6 shows an example of a radar system with a dual mode multiband antenna. The transmitter generates two frequency chirps at the same time: one chirp in the 76-81 GHz band with a limited bandwidth of 0.5 GHz for long range detection with limited resolution and another chirp in the 115-125 GHz band with 5 GHz bandwidth for high resolution detection with limited range.

The signals are combined at the input of the multiband amplifier in a Signal (200) Combiner and then are transmitted to an RF front-end as it has been already presented above. The signals from the output of the RF front-end are fed into a dual mode multiband antenna designed to radiate power in frequency band one for mode one and in frequency band two for mode two. Both modes should be orthogonal; one possibility is the use of a combination of Common Mode for band one and Differential Mode for band two.

A multiband receiver would comprise the same main building blocks as the transmitter, in a different order, and instead of the signal combiner it uses a signal splitter. A Dual-Band Radar Receiver according to this invention would be able to receive two frequency chirps at the same time: one chirp in the 76-81 GHz band with a limited bandwidth of 0.5 GHz for long range detection with limited resolution and another chirp in the 115-125 GHz band with 5 GHz bandwidth for high resolution detection with limited range.

The signals are received by a dual mode multiband antenna which is designed to receive power in at least two frequency bands this way eliminating the need for a signal combiner and phase shifter at the input.

Figure 7:
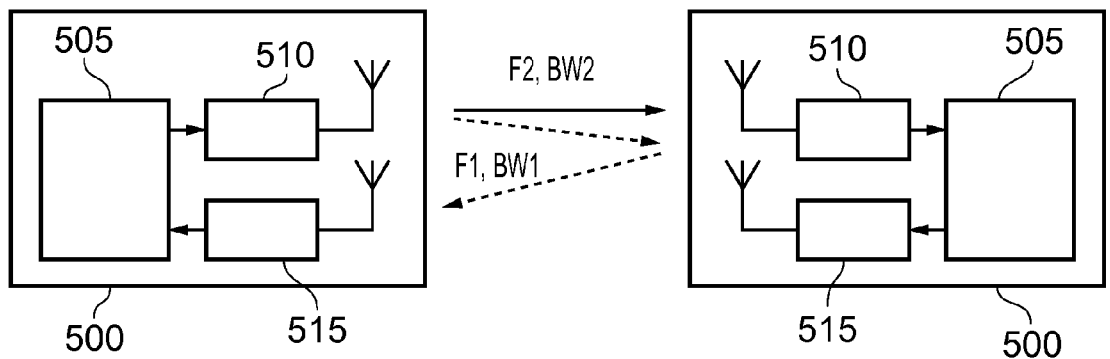
FIG. 7 depicts a radar and wireless communication system.

In another embodiment of the invention the RF front-end can be used in a low cost Radar plus Point to Point Communication system as shown in FIG. 7. This system consists of a transmitter plus receiver that is capable of emitting and receiving a series of continuous wave frequency chirps or pulses in frequency band F1 with bandwidths BW1 and a communication signal in frequency band F2 with bandwidth BW2.

The transmitter and receiver blocks are connected to a radar plus communication signal controller/processor block. This block generates the radar pulses/chirps and derives the range, velocity and angle of multiple targets from the time of flight and phase relations of the reflected signals and it generates and detects the communication signals.

This combined Radar/Communication system offers the following advantages compared to a conventional Radar plus Communication system:

It enables simultaneous detection and communication to objects in a particular angular direction. One example is a Car Radar/Intelligent Traffic System (ITS) Communication system in which ITS messages are exchanged using point to point communication between Cars be sending and receiving data in a specific spatial direction measured by the Radar system. This form of Spatial Re-use of the frequency spectrum avoids the problem of the limited system capacity of conventional non-directional ITS communication systems.

Combining Radar plus Communication functions according to this ID saves system cost by re-use of the transceiver and antenna hardware.

Figure 8:
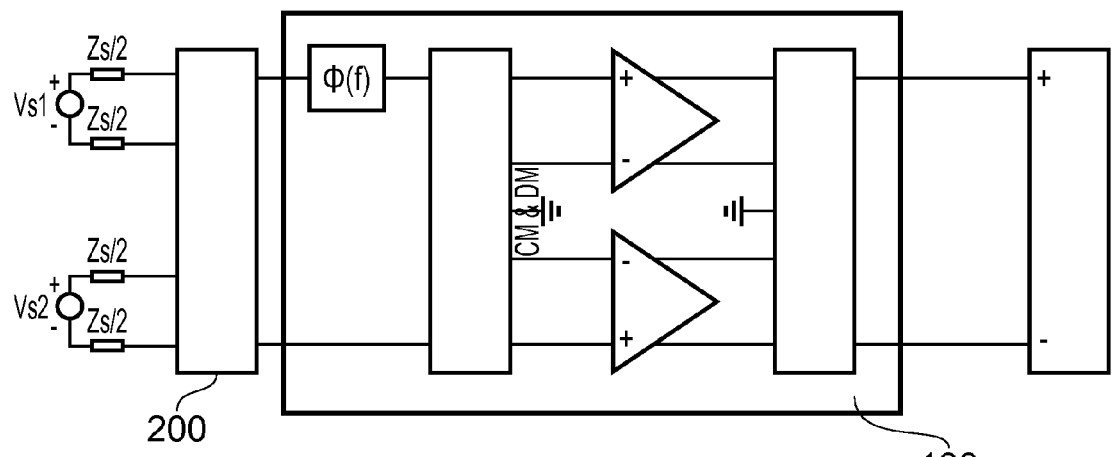
FIG. 8 depicts a radar and a wireless transmitter, according to the invention.

FIG. 8 depicts a radar and a wireless transmitter according to the invention. The transmitter generates a radar signal and a communication signal at the same time: a chirp in the 76-81 GHz band with a bandwidth of 1 GHz for Radar and a (complex) modulated carrier frequency in the 115-125 GHz frequency band with a bandwidth of 5 GHz for communication. The signals are combined at the input of the amplifier in a Signal Combiner. The signals at the output of the amplifier are fed to one dual mode multiband antenna designed to radiate power in frequency band one for mode one and in frequency band two for mode two. Both modes should be orthogonal; one possibility is the use of a combination of Common Mode for band one and Differential Mode for band two.

Figure 9:
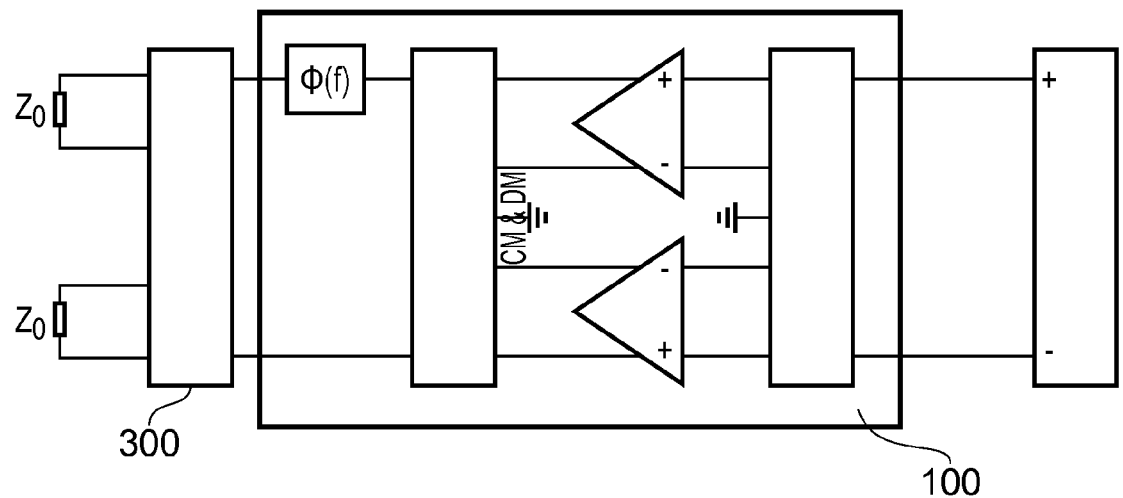
FIG. 9 depicts a radar and a wireless receiver, according to the invention.

FIG. 9 depicts a radar and a wireless receiver according to the invention. The receiver receives two signals at the same time: one chirp in the 76-81 GHz band with a bandwidth of 1 GHz and a communication signal in the 115-125 GHz band with a bandwidth of 5 GHz. The signals are received by a dual mode multiband antenna which is designed to receive power in two frequency bands. The signals are split at the output of the amplifier by use of a Signal Splitter and fed to two Single-Band receiver outputs for further signal processing.

Figure 10:
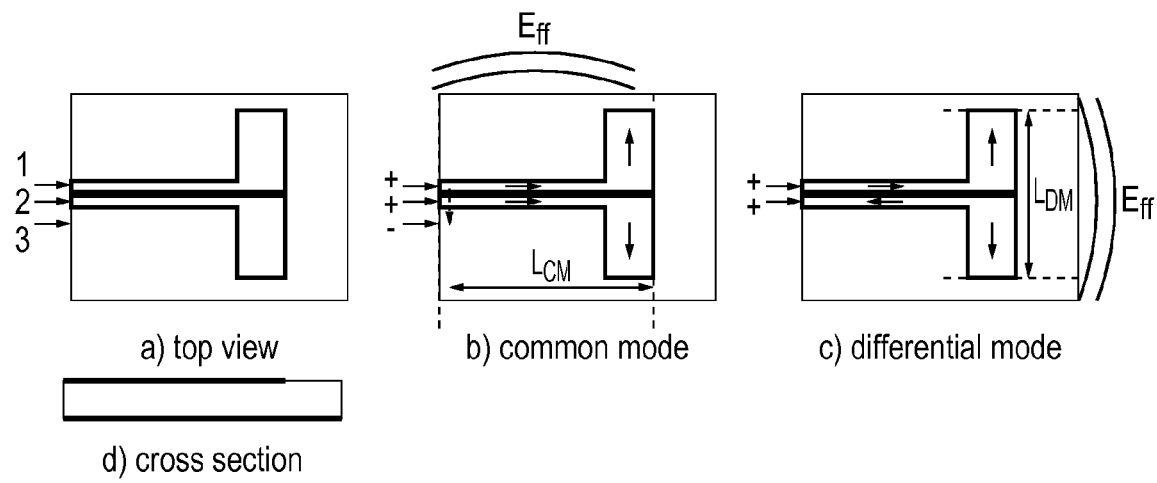
FIG. 10 depicts a dual band multi mode antenna.

FIG. 10 shows a dual mode multiband antenna concept suitable for use in the multi-band radar and communication systems described above.

This antenna can operate in two modes and multiple frequency bands:

Common Mode operation in the frequency bands for which the electrical length $L_{CM}$ is a multiple of a quarter wavelength. This common mode resonance radiates waves with horizontal polarization as depicted in FIG. 10b.

Differential Mode operation in the frequency bands for which the electrical length $L_{DM}$ is multiple of a half wavelength. This differential mode resonance radiates waves with vertical polarization as depicted in FIG. 10c.

Figure 11:
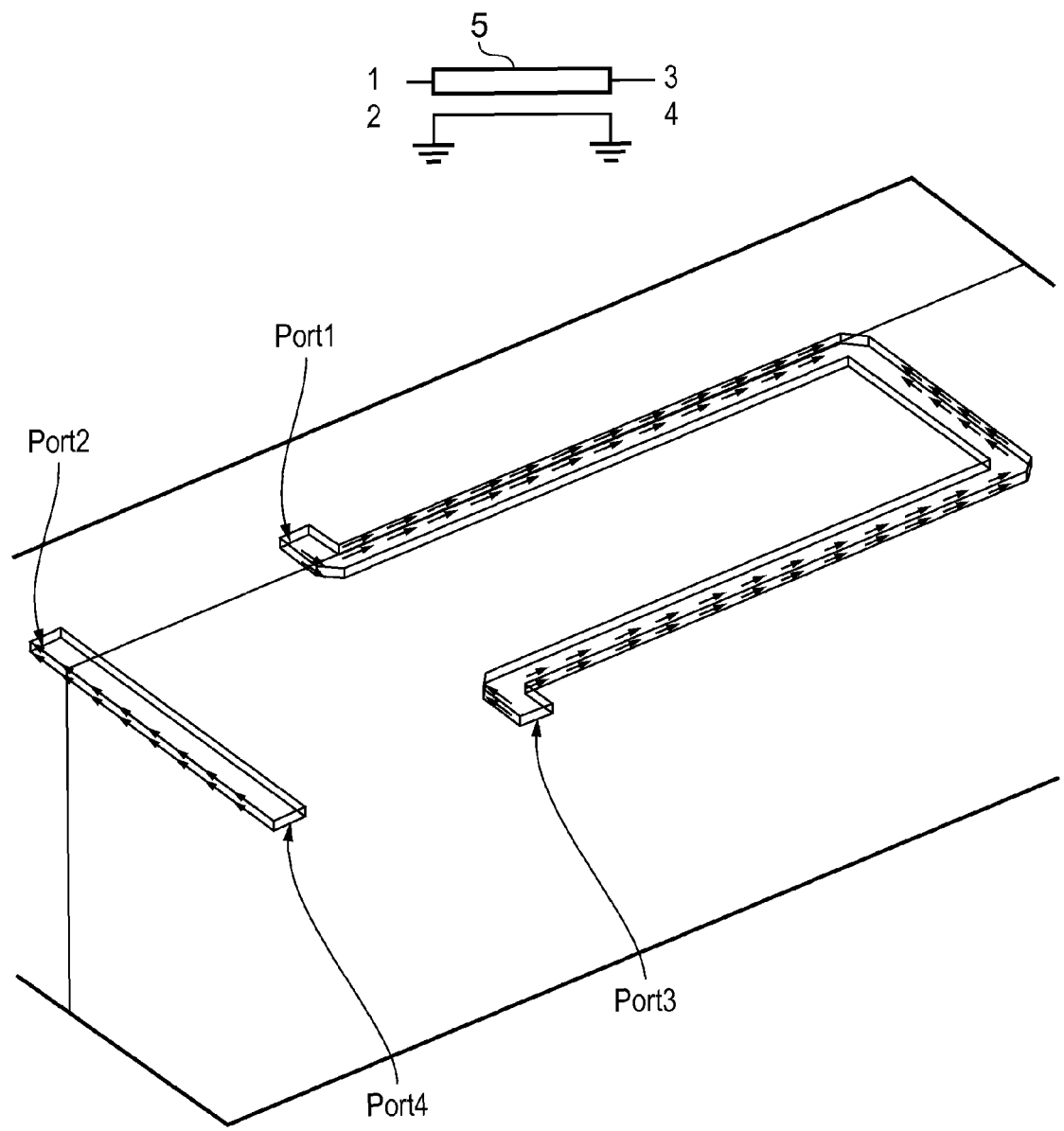
FIG. 11 depicts a layout of a transmission line based phase shifter, according to the invention.

FIG. 11 depicts a layout of a transmission line based phase shifter, according to the invention. The network consists of two uncoupled single-ended transmission lines with a different length. The connection points in the drawing of the phase shifter (5) correspond to that of the layout description. It is further remarked that the total electrical length is important for determining the phase shift but the actual geometry is less important to that.

It is remarked that the scope of protection of the invention is not restricted to the embodiments described herein. Neither is the scope of protection of the invention restricted by the reference numerals in the claims. The word "comprising" does not exclude other parts than those mentioned in the claims. The word "a(n)" preceding an element does not exclude a plurality of those elements. Means forming part of the invention may both be implemented in the form of dedicated hardware or in the form of a programmed purpose processor. The invention resides in each new feature or combination of features.

The invention claimed is:

1. An RF front-end adapted to perform either in a receiving mode or in a transmitting mode and adapted to receive or transmit signals located in at least two separated frequency bands, respectively comprising an input and an output and further comprising
    an input and an output;
    an input matching circuit comprising a first input coupled to the input;
    an output matching circuit coupled to the output;
    the input matching circuit being coupled to the output matching circuit via respective first amplifier and second amplifier;
    a phase shifter coupled either to the input of the RF front-end in a transmitting mode, or to the output of the RF front-end in a receiving mode;
    wherein the phase shifter provides at its output an odd multiple of 180° phase shift of a signal situated in a first frequency band applied to its input and
    wherein the phase shifter provides at its output an even multiple of 180° phase shift of a signal situated in a second frequency band applied to its input.

2. An RF front-end as claimed in claim 1, wherein the output matching circuit comprises a third input coupled to an output of the first amplifier circuit, and a fourth input coupled to an output of the second amplifier circuit.

3. An RF front-end as claimed in claim 1, wherein the input matching circuit has the same structure as the output matching circuit.

4. An RF front-end as claimed in claim 1, wherein the first phase shifter comprises a delay line or a lumped passive or active filter.

5. An RF front-end as claimed in claim 1, wherein the input matching circuit comprises a T filter comprising inductors.

6. An RF front-end as claimed in claim 1, wherein the output matching circuit comprises a T filter comprising inductors.

7. An RF front-end as claimed in claim 1, wherein the first amplifier and the second amplifier are single-ended or differential amplifiers.

8. A transmitter comprising a signal combiner coupled to an RF front-end as claimed in claim 1, the RF front-end being coupled to a dual mode multiband antenna.

9. A receiver comprising a dual band multiband antenna coupled to an RF front-end as claimed in claim 1, the RF front-end being coupled to a signal splitter.

10. A communication system comprising a transmitter as claimed in claim 8.

11. A communication system comprising a transmitter, the transmitter comprising a power combiner, coupled to an RF front-end as claimed in claim 1, the RF front-end being coupled to a dual mode multiband antenna.

12. A communication system comprising a receiver, the receiver comprising a dual mode multiband antenna coupled to an RF front-end as claimed in claim 1, the RF front-end being coupled to a signal splitter.

13. A radar system including at least a communication system as claimed in claim 1.

14. A vehicle comprising a radar system as claimed in claim 13.

* * * * *